US011233663B1

(12) United States Patent
Hoefler et al.

(10) Patent No.: US 11,233,663 B1
(45) Date of Patent: Jan. 25, 2022

(54) PHYSICALLY UNCLONABLE FUNCTION HAVING SOURCE BIAS TRANSISTORS

(71) Applicant: NXP USA, Inc., Austin, TX (US)

(72) Inventors: Alexander Hoefler, Austin, TX (US); Glenn Charles Abeln, Buda, TX (US); Brad John Garni, Austin, TX (US); Nihaar N. Mahatme, Austin, TX (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/935,439

(22) Filed: Jul. 22, 2020

(51) Int. Cl.
*G06F 11/30* (2006.01)
*H04L 9/32* (2006.01)
*G06F 12/14* (2006.01)

(52) U.S. Cl.
CPC .................. *H04L 9/3278* (2013.01)

(58) Field of Classification Search
CPC ..... H04L 9/085; H04L 9/3247; H04L 9/3033; H04L 9/3073
See application file for complete search history.

(56) References Cited

U.S. PATENT DOCUMENTS

| | | | |
|---|---|---|---|
| 8,415,969 B1 | 4/2013 | Ficke et al. | |
| 9,279,850 B1* | 3/2016 | Pedersen | H03K 19/003 |
| 9,966,954 B1 | 5/2018 | Yang et al. | |
| 10,103,733 B1 | 10/2018 | Gurrieri et al. | |
| 10,224,931 B1* | 3/2019 | Wang | H03K 19/17768 |
| 10,311,930 B1* | 6/2019 | Kim | G11C 11/161 |
| 10,468,104 B1* | 11/2019 | Anand | G11C 16/0466 |
| 10,469,083 B2* | 11/2019 | Bury | H01L 23/573 |
| 10,483,971 B1* | 11/2019 | Lu | G06F 30/398 |
| 10,574,469 B1* | 2/2020 | Garni | G11C 7/1006 |
| 10,714,199 B1* | 7/2020 | Bill | G11C 16/349 |
| 10,770,146 B2* | 9/2020 | Lu | G11C 16/22 |
| 10,803,942 B1* | 10/2020 | Jung | G11C 14/0081 |
| 10,811,073 B2* | 10/2020 | Giterman | G11C 11/402 |
| 10,880,102 B2* | 12/2020 | Lu | G11C 7/24 |
| 10,958,453 B2* | 3/2021 | Lu | H03K 3/84 |
| 10,972,292 B2* | 4/2021 | Tsai | G11C 11/417 |
| 11,005,669 B2* | 5/2021 | O'Connell | H04L 9/0866 |
| 11,108,572 B2* | 8/2021 | Lu | G06F 7/764 |
| 11,114,140 B1* | 9/2021 | Chern | G11C 7/1045 |
| 2018/0076957 A1* | 3/2018 | Watanabe | G06Q 20/363 |
| 2019/0079732 A1* | 3/2019 | Wu | G11C 17/18 |
| 2019/0221254 A1* | 7/2019 | Liu | G06F 21/45 |
| 2019/0229933 A1* | 7/2019 | Li | G06F 3/06 |
| 2019/0333567 A1* | 10/2019 | Giterman | G11C 11/402 |

(Continued)

Primary Examiner — Gary S Gracia (57) ABSTRACT

A physically unclonable function (PUF) includes an array of differential PUF bits arranged in rows and columns, wherein each differential bit is located at an intersection of a row and a column, and includes a first PUF cell coupled to a corresponding first bit line and first source line and a second PUF cell coupled to a corresponding second bit line and second source line. The PUF includes a source bias transistor coupled between each corresponding first source line and a first power supply terminal and between each corresponding second source line and the first power supply terminal, wherein a gate electrode of each of the source bias transistors is coupled to a second power supply terminal, and a corresponding set of margin transistors coupled in parallel with each source bias transistor, wherein a gate electrode of each margin transistor is coupled to receive a corresponding margin setting control signal.

20 Claims, 6 Drawing Sheets

(56) References Cited

U.S. PATENT DOCUMENTS

| | | | | |
|---|---|---|---|---|
| 2019/0378575 A1* | 12/2019 | Lu | ......................... | H04L 9/3278 |
| 2020/0014547 A1* | 1/2020 | Lu | ........................... | G06F 21/75 |
| 2020/0044871 A1* | 2/2020 | Lu | ....................... | G11C 11/4076 |
| 2020/0084052 A1* | 3/2020 | O'Connell | ............. | G11C 11/419 |
| 2020/0099540 A1* | 3/2020 | Lu | ........................... | G11C 7/24 |
| 2020/0119931 A1* | 4/2020 | Lu | ........................... | G06F 7/764 |
| 2020/0136839 A1* | 4/2020 | Tsai | ........................ | G11C 7/24 |
| 2020/0402589 A1* | 12/2020 | Lu | ....................... | G06F 12/1408 |
| 2021/0083887 A1* | 3/2021 | Lu | ........................ | H04L 9/3278 |
| 2021/0211312 A1* | 7/2021 | Lu | ........................... | G06F 21/75 |
| 2021/0226806 A1* | 7/2021 | Tsai | ..................... | H04L 9/3278 |
| 2021/0250191 A1* | 8/2021 | O'Connell | ............. | G11C 11/412 |

* cited by examiner

PHYSICALLY UNCLONABLE FUNCTION HAVING SOURCE BIAS TRANSISTORS

BACKGROUND

Field

This disclosure relates generally to electronic circuits and more specifically to a physically unclonable function (PUF) having source bias transistors.

Related Art

A physically unclonable function (PUF) is a physical system that will produce an unpredictable response when a stimulus is input. One example of a PUF uses the power-up state of a static random-access memory (SRAM). However, manufacturing variations, temperature, power supply, switching noise, device aging, and other factors may cause some of the cells of the PUF to power-up in different states at different times. Also, an implementation of the SRAM based PUF using a 6-transistor SRAM cell requires a relatively large amount of area on an integrated circuit (IC).

Because no two integrated circuits are exactly alike, the output of the PUF is difficult to predict, and therefore difficult to recreate. This makes the PUF useful for storing unique information about the IC. For example, the PUF may be used to generate a digital signature or encryption/decryption key.

Therefore, a need exists for a way to implement a PUF which reduces power and cost (e.g. area) and provides stable PUF bits which can be reliably sensed.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Generally, there is provided, a data processing system having a PUF implemented as an array of PUF cells coupled to bit lines/complementary bit lines and word lines. Each of the PUF cells includes an N-channel transistor having a drain connected to a bit line or complementary bit line, a source connected to a source line or complementary source line, and a gate connected to a word line. The PUF cells are organized into differential PUF bits, in which each PUF bit includes a pair of PUF cells, one coupled to the bit line and source line and the other to the complementary bit line and complementary source line. Due to manufacturing variations, the pair of PUF cells do not match exactly. In this manner, the resulting differential current through the PUF cells during a read operation indicates the stored bit value of the differential PUF bit.

In one embodiment, for a read operation, the bit lines and complementary bit lines are precharged, and at some time later, the sense amplifiers are enabled to detect the current differential between the corresponding bit line and complementary bit line so as to provide the corresponding data output. Depending on their construction, the sense amplifiers may also transform the current differential between the corresponding bit line and complementary bit line into a voltage signal before sensing. In addition, an always-on source bias transistor is coupled to each of the source line and complementary source line of each differential bit. By sizing the precharge transistors and the always-on source bias transistors to have a drive strength similar to that of the PUF cells themselves, improved current differentials and reduced voltage swing on the bit lines and complementary bit lines may be achieved during reads. This can result in improved sensing and reduced power consumption.

In one embodiment, margin transistors coupled in parallel with each of the always-on source bias transistors may be used during an enrollment process to identify stable bits in the PUF array. Each margin transistor can be selectively enabled by a corresponding margin setting signal. A first set of margin transistors can be enabled during a first margin read to determine those unstable "1" bits which are likely to flip to a "0" with variations in voltage or temperature, and a second set of margin transistors can be selectively enabled during a second margin read to determine those unstable "0" bits which are likely to flip to a "1" with variations in voltage or temperature. By selectively enabling the first or second set of margin transistors, a skew in the drive strength between the source lines and complementary source lines is created, in which enabling the first set for the first margin read results in a skew in one direction, and enabling the second set for the second margin read results in a skew in the opposite direction. By determining which differential bits can overcome these skew conditions and reliably output a same bit value under both skew conditions (i.e. during both margin reads), stable differential bit PUF cells can be identified. The identified stable cells may then be used to identify stable addressable portions within the PUF (such as reliable subwords of 4 bits) to reliably provide PUF data, even across temperature and voltage variations.

Figure 1:
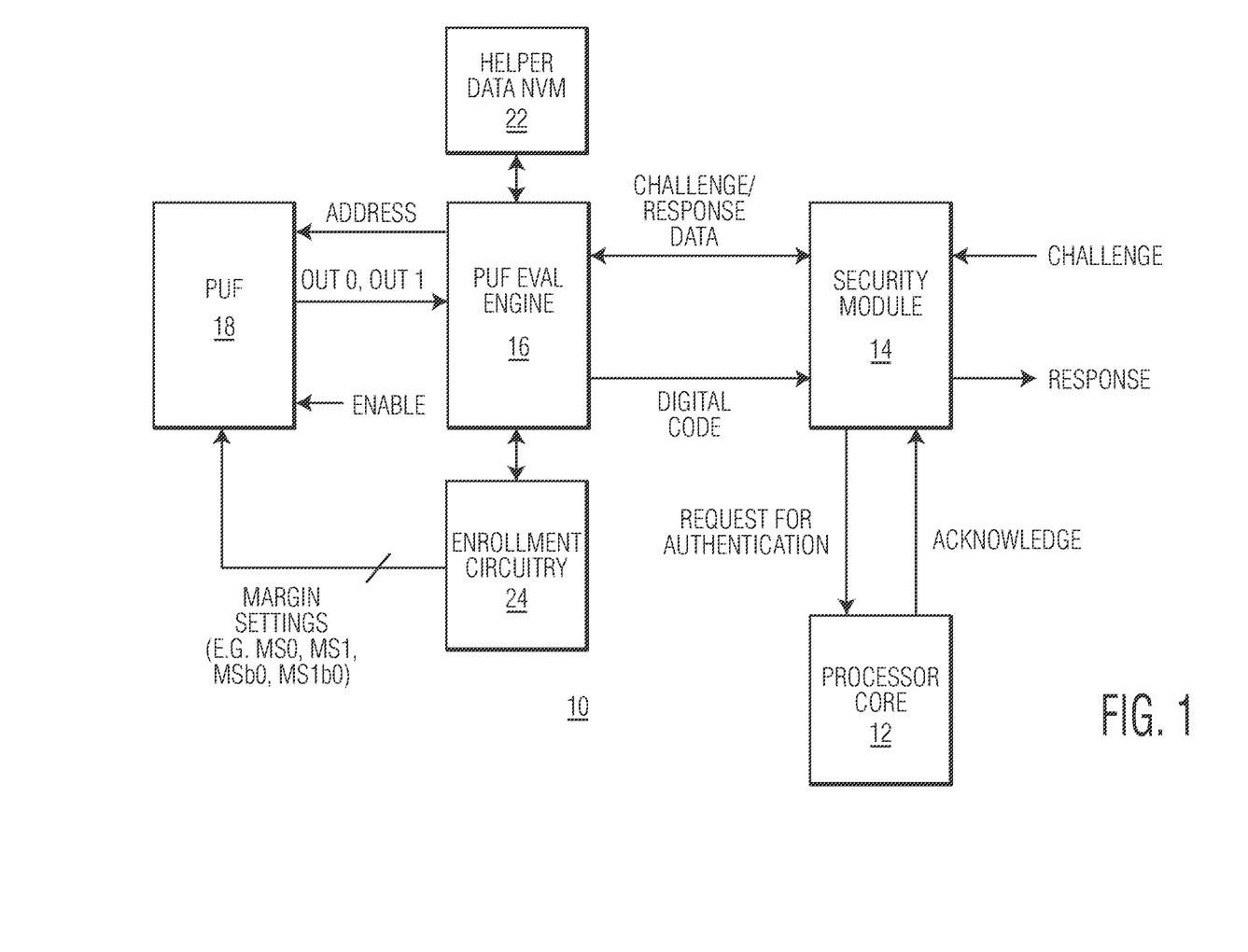
FIG. 1 illustrates a system in accordance with an embodiment.

FIG. 1 illustrates a data processing system 10 in accordance with an embodiment. Data processing system 10 includes processor core 12, security module 14, PUF evaluation engine 16, PUF 18, enrollment circuitry 24, and helper data storage circuitry 22. In one embodiment, helper data storage circuitry 22 is implemented with a non-volatile memory (NVM) such as electrically programmable fuses (e-fuses), and may therefore be referred to herein as helper data NVM 22 or NVM 22). Processor core 12 can be any kind of processor core, or a plurality of cores, for executing instructions. Processor core 12 is connected to security module 14 to provide an acknowledge signal ACKNOWLEDGE when a request for authentication (REQUEST FOR AUTHENTICATION) is provided by security module 14. Security module 14 provides the REQUEST FOR AUTHENTICATION in response to receiving a challenge signal (CHALLENGE) from a requestor. PUF evaluation engine 16 may provide response data RESPONSE DATA in response to the CHALLENGE. To get the RESPONSE DATA, PUF evaluation engine 16 provides an address (ADDRESS) to PUF 18. In response, PUF 18 provides a PUF response from a PUF array as a plurality of voltage signals (OUT 0, OUT 1) back to PUF evaluation engine 16. PUF evaluation engine 16 evaluates the response and generates a digital code (DIGITAL CODE) from the plurality of voltage signals. The digital code is provided to security module 14 and used by security module 14 to generate a unique chip ID, encryption/decryption key, digital signature, or the like as a response (RESPONSE).

Enrollment circuitry 24, along with PUF evaluation engine 16, performs an enrollment on PUF 18 to determine which PUF bits are sufficiently stable, and information identifying the stable PUF bits is stored as helper data in NVM 22 (either by PUF evaluation engine 16 or enrollment circuitry 24). Those PUF bits indicated by the helper data in NVM 22 are used by PUF evaluation engine 16 to obtain the PUF response which is used to generate the digital code. During the enrollment, PUF circuitry 24 provides different margin settings to PUF 18, in which PUF evaluation engine 16 performs reads with the different margin settings, as will be discussed in more detail below. Data processing system 10 may also include other circuits and modules not illustrated in FIG. 1. For example, data processing system 10 may include input/output circuits, memory, analog-to-digital converters, phase-locked loops, and the like, depending on the application.

Figure 2:
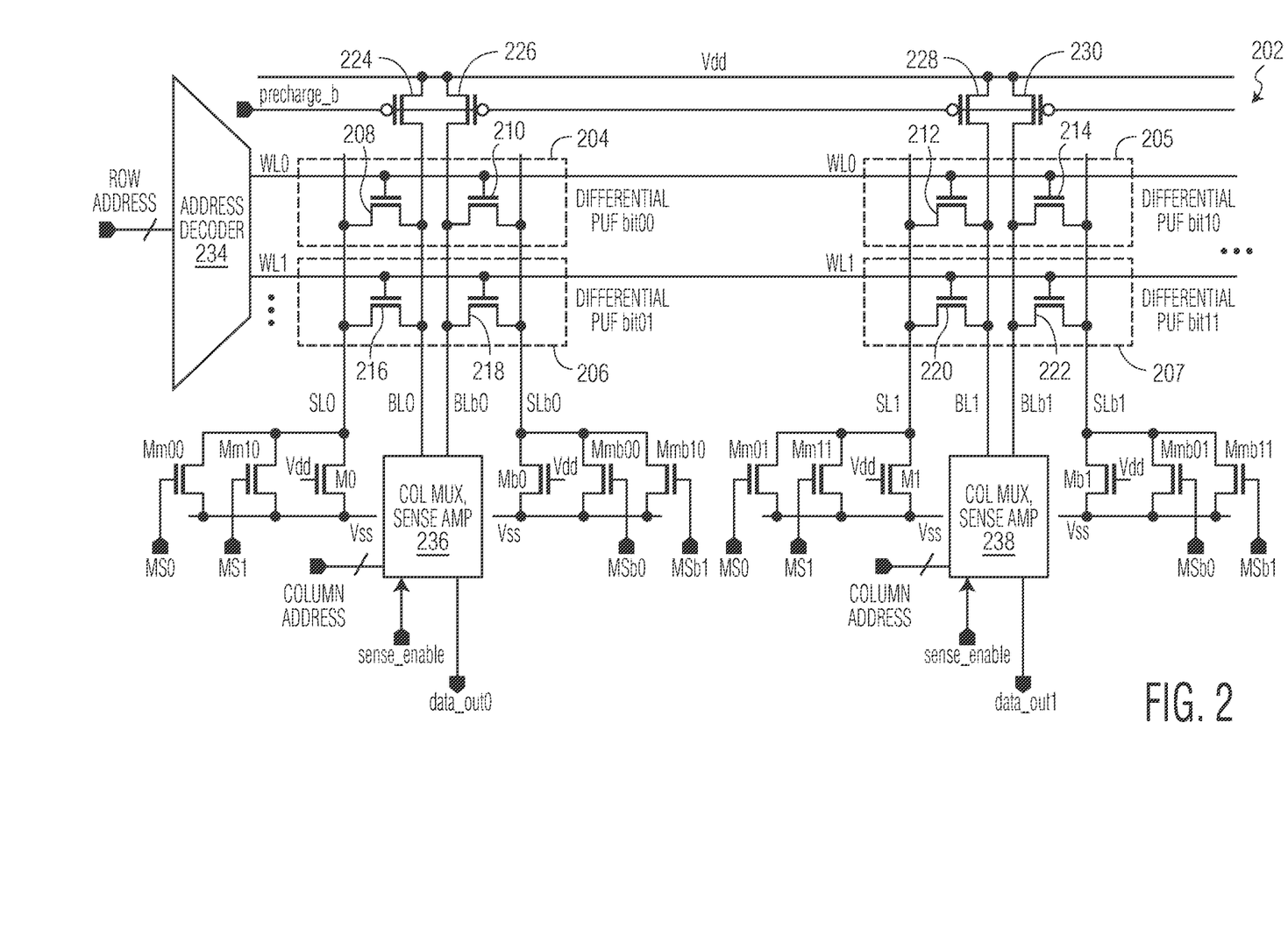
FIG. 2 illustrates the PUF of FIG. 1 in accordance with an embodiment.

FIG. 2 illustrates PUF 18 of FIG. 1 in accordance with an embodiment. PUF 18 includes a PUF array 202, address decoder 234 (which may also include word line drivers), precharge devices 224, 226, 228, and 230, sense amplifiers 236 and 238 (which may include column multiplexers (MUXes)), and N-channel source bias transistors Mm00, Mm10, M0, Mb0, Mmb00, Mnb10, Mm01, Mm11, M1, Mb1, Mmb01, and Mmb11. Each source bias transistor M0, Mb0, M1, and Mb1 have their gate electrodes coupled to a first power supply terminal (which provides a first power supply voltage, Vdd) such that they are always turned on during the operation of PUF 18. These may be referred to as the always-on source bias transistors. Each of source bias transistors Mm00, Mm10 Mmb00, Mmb10, Mm01, Mm11, Mmb01, and Mmb11 may be referred to as margin source bias transistors (or margin setting transistors or margin transistors) in which gate electrodes of a first set of margin transistors (including Mm00 and Mm01) are coupled to receive a first margin setting signal, MS0, gate electrodes of a second set of margin transistors (including Mmb00 and Mmb01) are coupled to receive a second margin setting signal, MSb0, which is the complement of MS0. Gate electrodes of a third set of the margin transistors (including Mm10 and Mm11) are coupled to receive a third margin setting signal, MS1, and gate electrodes of a fourth set of the margin transistors (including Mmb10 and Mmb11) are coupled to receive a fourth margin setting signal, MSb1, which is the complement of MS1.

Therefore, MS0 can be asserted (to a login level one) to enable or turn on the first set of margin transistors, MS1 can be asserted (to a logic level on) to enable or turn on the third set of transistors. Similarly, MSb0 can be asserted (to a logic level one) to enable or turn on the second set of margin transistors, and MSb1 can be asserted (to a logic level one) to enable or turn on the fourth set of margin transistors.

PUF array 202 includes an array of single-transistor PUF cells arranged in rows and columns. A row includes a word line and all the cells connected to the word line. For example, in PUF array 202, one row includes a word line labeled "WL0" and PUF cells 208, 210, 212, and 214 connected to word line WL0. Another row includes word line WL1 and PUF cells 216, 218, 220, and 222 connected to WL1. Likewise, a column of PUF array 202 includes a column line (which may either be a bit line (BL) or a complementary bit line (BLb)) and all the PUF cells connected to that column line. For example, one column includes a bit line labeled "BL0" and PUF cells 208 and 216. Another column includes complementary bit line BLb0 and PUF cells 210 and 218. Similarly, another column includes a bit line labeled "BL1" and PUF cells 212 and 220. Another column includes complementary bit line BLb1 and PUF cells 214 and 222.

More specifically, in FIG. 2, the single-transistor PUF cells are connected at intersections of the word lines and the column lines. That is, each PUF cell is a single N-channel transistor connected at the intersection of a word line and a column line. For example, the single-transistor of PUF cell 208 has a drain connected to bit line BL0, a gate connected to word line WL0, and a source connected to a source line labeled "SL0". Similarly, the single-transistor of PUF cell 210 has a drain connected to complementary bit line BLb0, a gate connected to WL0, and a source connected to a complementary source line labeled "SLb0". As another example, PUF cell 216 has a drain connected to BL0, a gate connected to WL1, and a source connected to SL0, and PUF cell 218 has a drain connected to BLb0, a gate connected to WL, and a source connected to SLb0. The source lines and complementary source lines of array 202 may be referred to as SL and SLb, respectively, and the bit lines and complementary bit lines as BL and BLb.

Array 202 is arranged such that two single-transistor PUF cells together form a differential PUF bit, each differential PUF bit coupled to a corresponding word line, a corresponding bit line pair (i.e. bit line/complementary bit line pair), and a corresponding source line pair (i.e. source line/complementary source line pair). For example, PUF cells 208 and 210 together form a differential PUF bit 204 corresponding to PUF bit00. That is, both cells 208 and 210 store one PUF bit. As another example, PUF cells 216 and 218 together form a differential PUF bit 206 corresponding to PUF bit01. PUF cells 212 and 214 together form differential PUF bit 205 corresponding to PUF bit10, and PUF cells 220 and 222 together form differential PUF bit 207 corresponding to PUF bit11. Therefore, array 202 stores an array of differential PUF bits, in which each differential PUF bit uses two PUF cells.

Differential PUF bits are also arranged in rows and columns, in which a differential PUF bit is located at each intersection of a WL and a differential bit column (in which the differential bit column includes a corresponding bit line, complementary bit line, source line, and complementary source line). Differential PUF bits 204 and 206 are in differential bit column 0, and are coupled to bit line pair BL0/BLb0 and source line pair SL0/SLb0. Differential PUF bits 205 and 207 are in differential bit column 1, and are coupled to bit line pair BL1/BLb1 and source line pair SL1/SLb1.

The bit line pair of a differential bit column, such as BL0 and BLb0 of differential bit column 0, is coupled to a corresponding sense amplifier, such as sense amplifier 236. BL1 and BLb1 of differential bit column 1 are coupled to corresponding sense amplifier 238. In one embodiment, each bit line pair of a column is coupled to its corresponding sense amplifier by way of a corresponding column MUX. The column MUXes receive a column address which results in coupling the selected bit line pair from array 202 to the corresponding sense amplifier. Each sense amplifier receives a sense_enable signal which, when asserted, enables sensing by the sense amplifiers in order to provide the output data from array 202, e.g. data_out0 and data_out1 (also referred to as OUT 0 and OUT 1, respectively). Note that while array 202 is illustrated as having two differential bit columns resulting in two output data bits (data_out0 and data_out1), array 202 can have any number of differential bit columns, in which each differential bit column provides a corresponding output data bit from array 202.

Each differential bit column of array 202 also includes a pair of always-on source bias transistor with the gate electrodes coupled to the first power supply terminal (which provides Vdd). A first source bias transistor of the pair has a drain coupled to the source line of the differential bit column, and a second source bias transistor of the pair has a drain coupled to the complementary source line of the differential bit column. The sources of the source bias transistors are coupled to a second power supply terminal, which provides a second power supply voltage, Vss (which is a lower voltage than Vdd.) In addition, each differential bit column of array 202 includes a set of margin source bias transistors coupled in parallel with each of the always-on source bias transistors. The gate electrode of each margin source bias transistor of the differential bit column receives a different margin setting signal. For example, in differential bit column 0, always-on source bias transistor M0 is coupled between SL0 and Vss, and the set of margin transistors Mm00 and Mm10 are coupled in parallel with M0. Similarly, always-on source bias transistor Mb0 is coupled between SLb0 and Vss, and the set of margin transistors Mmb00 and Mmb10 are coupled in parallel with M1. In differential bit column 1, always on source bias transistor M1 is coupled between SLb1 and Vss, and the set of margin transistors Mm01 and Mm11 are coupled in parallel with M1. Similarly, always on source bias transistor Mb1 is coupled between SLb1 and Vss, and the set of margin transistors Mmb01 and Mmb11 are coupled in parallel with Mb1.

With the nomenclature used in FIG. 2, the M or Mb refers to the "always-on" source bias transistors in which the number following the M or Mb refers to the differential bit column number of the array, while the Mm or Mmb refers to the margin setting transistors, in which the second number following the Mm or Mmb refers to the differential bit column number of the array, and the first number following the Mm or Mmb enumerates the transistor within the set of margin source bias transistors coupled in parallel with the corresponding always-on source bias transistor. In the illustrated embodiment, each set of margin transistors includes two margin transistors, each receiving a corresponding margin setting signal (e.g. one receiving MS0 and the other MS1, or one receiving MSb0 and the other MSb1). However, any number of margin transistors may be used. For example, if each set has four margin transistors, four margin setting signals would be provided (MS0-MS3) or (MSb0-MSb3) and the transistors would be labeled "Mm0$x$, Mm1$x$, Mm2$x$, Mm3$x$" or "Mmb0$x$, Mmb1$x$, Mmb2$x$, Mmb3$x$", respectively, in which the "x" is the differential bit column number. Also note that any number of parallel transistors can be used to implement the always-on source bias transistors.

Referring to the illustrated embodiment of FIG. 2, the first (e.g. Mm00, Mm01) and third (e.g. Mm10, Mm11) set of margin transistors can be used to increase the drive strength on the source lines (e.g. SL0, SL1) while the second (e.g. Mmb00, Mmb01) and fourth (e.g. Mmb10, Mmb11) set of margin transistors can be used to increase the drive strength on the complementary source lines (e.g. SLb0, SLb1). In one embodiment, to increase the drive strength on the source lines, both MS0 and MS1 are asserted so as to turn on both Mm00 and Mm10 and both Mm01 and Mm11. Alternatively, only one of MS0 or MS1 may be asserted (e.g. to turn on only one of Mm00 or Mm10 and only one of Mm01 or Mm11) to provide a lesser increase in drive strength as compared to asserting both MS0 and MS1. The same descriptions apply to increasing the drive strength on the complementary source lines. For example, both MS0$b$ and MS1$b$ can be asserted to a logic level one to provide an increased drive strength on SLb0 and SLb1. Alternatively, only one of MS0$b$ or MS1$b$ may be asserted to provide a lesser increased drive strength.

In one embodiment, all of the margin transistors are sized the same so as to have the same strength. In this manner, each transistor provides a same weight in drive strength and any number of transistors within a set of margin transistors can be enabled or turned on to set the desired drive strength on the corresponding SL or SLb. Alternatively, they may be sized differently or otherwise processed differently, to have different strengths. For example, Mm10 may be made to be twice as strong as Mm00. In this manner, each of the margin transistors provide a different weight in the drive strength increase on the corresponding SL or SLb. Also, in one embodiment, the complementary margin transistors (e.g. Mm00 and Mmb00) may also be symmetrical (sized the same). However, alternatively, the complementary margin transistors may be sized or processed differently so as to have different strengths. In this manner, asserting MS0 and MS1 may provide a different increase in drive strength on SL as compared to the increased in drive strength on SLb by asserting MSb0 and MSb1. Therefore, the margin transistors can be designed in a variety of different ways to provide increased drive strength to the source lines or to the complementary source lines of array 202, as needed, and as will be described further below with respect to an enrollment procedure. Note that the margin setting signals may also be referred to as margin control signals.

In the illustrated embodiment, each differential bit column also includes a precharge transistor coupled between the bit line and Vdd and a precharge transistor between the complementary bit line and Vdd. For example, differential bit column 0 includes precharge transistor 224 having a source coupled to Vdd and a drain coupled to BL0, and a precharge transistor 226 having a source coupled to Vdd and a drain coupled to BLb0. As another example, differential bit column 1 includes precharge transistor 228 having a source coupled to Vdd and a drain coupled to BL1, and a precharge transistor 230 having a source coupled to Vdd and a drain coupled to BLb1. The gate electrodes of each of the precharge transistors in array 202 receives a precharge control signal, precharge_b, in which precharge_b is asserted to a logic level zero to precharge the bit line pairs of array 202.

While array 202 of FIG. 2 includes a 2×2 array of differential PUF bits, array 202 may include any number of PUF cells arranged to provide any number of differential PUF bits, in which array 202 stores Y differential PUF bits using "2*Y" PUF cells. Likewise, depending on the number of PUF cells, array 202 can include any number of word lines, bit line pairs, and source line pairs. In one embodiment, all of the source lines (e.g. SL0 and SL1) are tied together, and all the complementary source lines (e.g. SLb0 and SLb1) are tied together. The array of N-channel transistors may be implemented using a conventional complementary metal-oxide semiconductor (CMOS) manufacturing process. Note that instead of the precharge transistors, each of bit lines and complementary bit lines can be connected to a corresponding current source for use during a read operation.

Word lines WL0-WL1 are each connected to address decoder 234 (which includes word line drivers to drive the selected word line). In operation, when a PUF response is read out of PUF array 202, address decoder 234 selects and drives one of the word lines in response to receiving an address labeled "ADDRESS". The PUF cells connected to the selected word line (referred to as the selected PUF cells) will then provide a current path to Vss, in which paired selected PUF cells correspond to the selected differential PUF bits. In one embodiment, each of the sense amplifiers implements a comparator which receives the corresponding bit line pair of the selected differential PUF bit as inputs.

For a read operation, in one embodiment, each of the bit lines and complementary bit lines are first precharged to a precharge voltage level, and then, in response to assertion of the sense_enable signal, the comparators compare voltages or currents between the bit line and complementary bit line of the selected differential PUF bit (provided by the corresponding paired PUF cells of the selected differential PUF bit) coupled to the comparator. In response to the comparison, the sense amplifier provides the corresponding output data as a logic level one or a logic level zero. In one embodiment, when the current or voltage drop through the bit line is less than that through the complementary bit line, the corresponding output data is a logic level one, and if it is greater, then it is a logic level zero. Alternatively, this can be reversed such that a logic level one corresponds to the current or voltage drop on the bit line is greater than that of the complementary bit line. Note that if current sources are used instead of the precharge transistors, then during the read operation, bit line and complementary bit line currents are generated by the current sources connected to the selected bit lines along with the conductive PUF cell.

The mismatch of transistors (due to manufacturing variation) between the PUF cells of the selected differential PUF bit causes the voltage drop (or current) difference during the read operation. That is, the two transistors in the PUF cells of a differential PUF bit are identically drawn, in that they match in size, type, and materials. However, due to process variations, the two identical transistors include inherent mismatch, resulting in the voltage differences or a current difference between the bit line and complementary bit line of a differential PUF bit. Note that any sense amplifier may be used for array 202 so long as it can amplify and detect this bit line voltage difference between BL and BLb, or alternatively, a current difference. The sense amplifiers detect the voltage (or current) difference and output signals representative of a logic state (one or zero) stored in the selected differential PUF bit. The output data signals, data_out0 and data_out1, are evaluated by PUF evaluation engine 16 to provide bits of a multi-bit digital code. The multi-bit digital code can have any number of bits. After the voltage signal is provided to PUF evaluation engine 16, PUF system 18 may be turned off. PUF evaluation engine 16 then generates a logic bit of a digital code from the voltage signal.

PUF array 202 of the described embodiment requires a very small area on an integrated circuit when compared to an SRAM PUF. Also, because PUF 18 can be turned off or disabled after each use, the single-transistor PUF cells do not suffer as much from aging effects.

In order to enhance variation of the differential bit line pair signals, the precharge transistors and always-on source bias transistors are sized to be closer in size to the PUF cells and to thus have a drive strength closer to the drive of the PUF cells. This results in increased voltage variation, thus increasing the capability of the sense amplifier to reliably sense some PUF bits that would otherwise be marginal (marginal bits). This sizing also helps in limiting the bit line swing and the bit line current, thereby reducing dynamic power during PUF operation. As used herein, a marginal differential PUF bit (margin bit) refers to a PUF bit that, due to its small amount of transistor mismatch, is susceptible to being unstable, such as across temperature variations. For example, a marginal bit may not consistently provide the same logic value each time it is read. To reduce the susceptibility of array 202 towards marginal bits, and to help enable low power operation (through low bit line swing and low cell current), the differential PUF bits are read by also source biasing the PUF cells (with the always-on source bias transistors M and Mb).

Therefore, a read operation on array 202 is performed such that the bit line precharge voltage value is lower than Vdd, such as between approximately 0.5 and 0.7 Vdd. This may be achieved by sizing the precharge transistors (e.g. 224, 226, 228, 230) and the always-on source bias transistors (e.g. M0, Mb0, M1, Mb1) to have a weak drive strength, such that their drain currents approach the cell current of the PUF cell transistors (e.g. 208/210, 212/214, 216/218, and 220/222). This sizing can be achieved by adjusting the ratio of device width (W) over device length (L).

Note that in conventional memories, any precharge or virtual ground transistor are sized to have a much larger drive strength (much higher width to length ratio, W/L) as compared to the bit cell transistors in order to achieve a precharge and source bias level close to Vdd and Vss, respectively, for improved operation of the memory. However, in one embodiment of the present invention, the ratios of the PUF cells are much reduced as compared to the conventional memories. For example, in one embodiment, the transistor of each PUF cell has a W/L ratio of 2.6, while in a conventional memory, the precharge and the source bias devices have W/L ratios of 13.3 and 22.8, respectively. However, the precharge and the always-on source bias transistors of PUF 18 are sized such that the W/L rations are no more than 4 and 6, respectively. Therefore, note that the W/L ratios of the precharge transistors or the always-on source bias transistors are not more than approximately twice the W/L ratio of the PUF cell transistors.

Figure 3A:
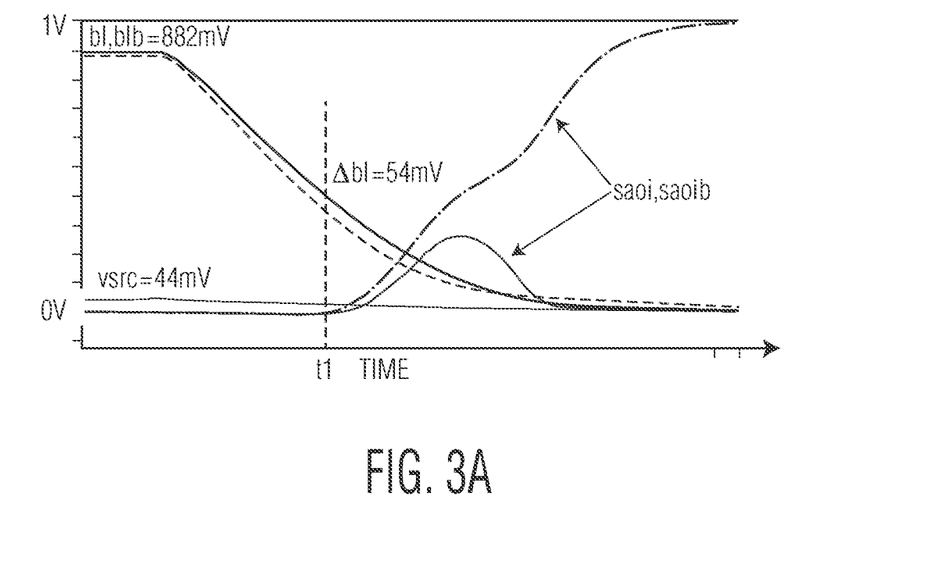
FIGS. 3A and 3B illustrate graphs of various signals in accordance with an embodiment.
Figure 3B:
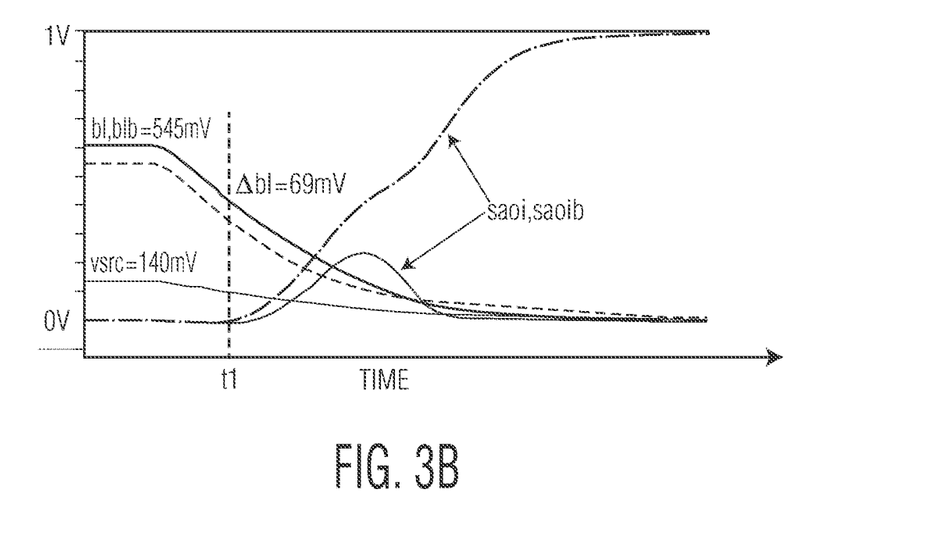

FIGS. 3A and 3B illustrate a simulated comparison between the signal characteristics during sensing of a PUF differential bit using a precharge operation with larger (stronger) sizing of the precharge devices and source bias transistor versus using a weaker precharge transistor and source bias transistor. In each of FIGS. 3A and 3B, voltage levels of an example BL and BLb are illustrated (the solid black line and dashed line pair labeled "bl,blb"), along with Vsrc (corresponding to the voltage at the source of the always-on source bias transistors, which provide a virtual ground for array 202) and signals saoi and saoib of the corresponding sense amplifier. The signals saoi and saoib (the dashed and dotted line and the lighter solid line) represent the sense amplifier output node (saoi) and complementary output node (saoib). These nodes prove the differential signal that allows the sense amplifier to provide a logic level one or zero at the data output, based on the comparison between saoi and saoib.

For example, FIG. 3A illustrates an example of a using a precharge device in which the example BL and BLb are precharged to 882 mV, close the Vdd (which is 1V in the current example). However, in FIG. 3B, due to the weaker precharge devices (e.g. 224, 226), BL and BLb are precharged to a lower precharge voltage (545 mV, which is less than the 882 mV of FIG. 3A). This results in a reduction in the total bit line voltage swing during operation, which reduces dynamic power. Also, in FIG. 3A, with a stronger source bias transistor, Vsrc is only 44 mV because it is pulled close to Vss (ground, in this example). However, in FIG. 3B, due to the weaker source bias transistor (e.g. always-on transistors M0 and Mb0, which may also be referred to as virtual ground transistors), Vsrc is pulled down to 140 mV (which is greater than the 44 mv of FIG. 3A). In doing so, the PUF cell transistors (e.g. 208, 210) operate closer to their threshold voltage (Vth). That is, in FIG. 3B, the gate to source voltage (Vgs) of the transistor approaches the threshold voltage (Vth), as opposed to the situation in FIG. 3A in which, due to the stronger precharge and virtual ground devices, the gate to source voltages of the PUF transistors are much greater than the threshold voltage, providing a strong overdrive. With the biasing conditions of FIG. 3B in which Vgs approximately equals Vth, the variation of the bit line differential of saoi and saoib is increased because a given difference in Vth between matched devices within a PUF differential bit causes a larger cell current difference. For example, as compared to FIG. 3A, time t1 (corresponding to when saoi and saoib begin increasing their voltage differential during sensing) in FIG. 3B occurs sooner in time (i.e. faster) from when sensing is enabled at the end of the precharge (note that both FIGS. 3A and 3B are using the same time scale on the x axis).

Therefore, in PUF 18, the random feature in any differential PUF bit (formed with two PUF cells) is the cell current differential between the two cells of the differential PUF bit which are connected via BL and BLb to the corresponding sense amplifier (via a column MUX, if present) through activation of the selected WL. That is, upon activation of the selected WL (e.g. WL0), the corresponding sense amplifier (e.g. 236) will subsequently resolve the current differential and provide a random 0 or 1 (based on the device mismatch between the two PUF cells).

Figure 4A:
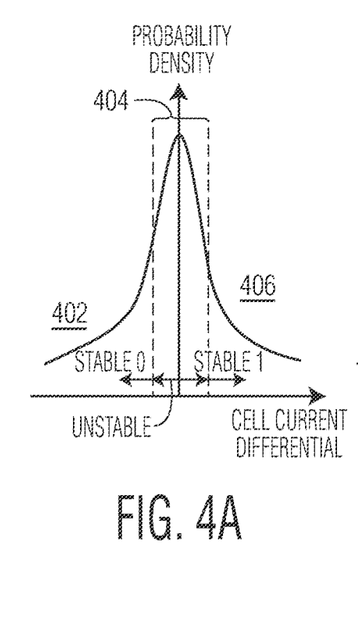
FIGS. 4A-4D illustrates probability density charts in accordance with various examples.

A probability distribution of the cell current differential in PUF array 202 is qualitatively illustrated in FIG. 4A. The distribution includes three regions: a stable 0 region 402, a stable 1 region 406, and an unstable region 404. The unstable region includes the collection of all differential PUF bits which are very closely matched and will change their logic state when the PUF read operation moves to a different combination of voltage (V) and temperature (T) conditions. In the stable 0 region 402, the differential PUF bits will be reliably read as a zero, even with different V and T combinations, and in stable 1 region 406, the differential PUF bits will be reliably read as a one, even with different V and T combinations. During an enrollment procedure (e.g. which may occur during final testing of PUF 18, prior to normal operation in the field), PUF 18 will be accessed in a specific way at a given V and T to determine which PUF differential bits fall in the unstable region, so that they may be avoided during reconstruction (in which only the stable PUF differential bits are used during normal operation by PUF evaluation engine 16 to generate the digital code).

In one embodiment, during enrollment, PUF 18 will be read by selecting different margin settings (by using the margin transistors within PUF 18) in an attempt to identify unstable differential PUF bits. Operation of PUF 18 during enrollment and then subsequent reconstruction will be discussed with respect to FIGS. 4B-4D in combination with the diagram of FIG. 5 and the flow diagram of FIG. 6.

Figure 6:
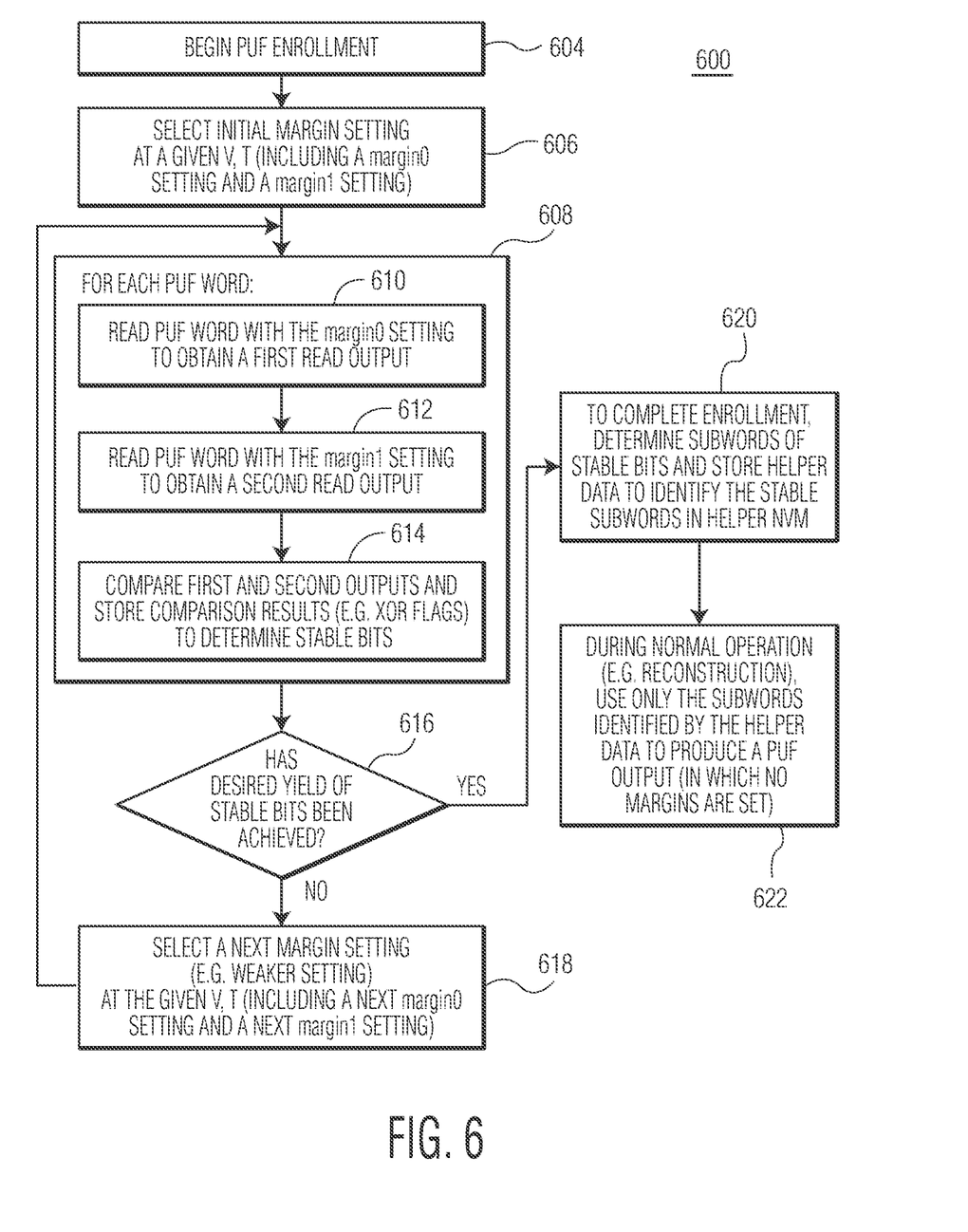
FIG. 6 illustrates, in flow diagram form, a method of performing enrollment in accordance with an embodiment.

Referring to method 600 of FIG. 6, PUF enrollment begins in block 604 and an initial margin setting is selected at a given V and T. In one embodiment, the initial margin setting corresponds to a margin 0 read. However, alternatively another margin setting can be selected. Then, in block 608, margin reads are performed for each PUF word stored in PUF 18 (in array 202). In block 610, the PUF word is read with the margin 0 setting to obtain a first read output. In performing the read with the margin 0 settings, the drive strengths of the SL and SLb of each differential bit column in array 202 are skewed such that the margin 0 read will force all differential PUF bits that are located in the unstable region to be read as a logic 0. Therefore, in one embodiment, MS0 and MS1 are asserted to a logic level one (thus MSb0 and MSb1 are deasserted or negated to a logic level zero). This results in turning on Mm00, Mm10, Mm01, and MM11, and turning off Mmb00, Mmb10, Mmb01, and Mmb11. This increases the drive strength on each of SL0 and SL1 with respect to SLb0 and SLb1, respectively, such that the drive strengths are skewed in a first direction.

Figure 4B:
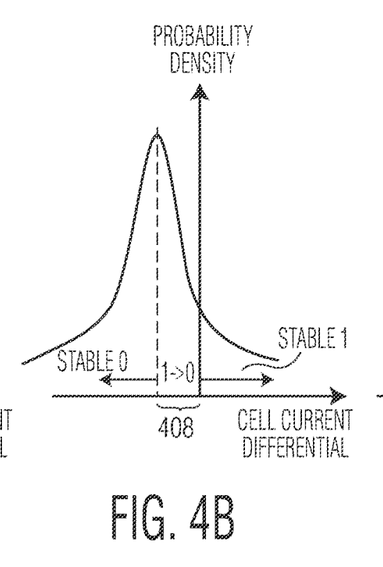

By skewing the drive strength in this manner the probability density is shifted to the left, as seen in FIG. 4B, in which those bits that were in the portion of the unstable region storing ones (such as in FIG. 4A) are forced to flip and be read as a 0, as indicated by region 408 in FIG. 4B. That is, within region 408, the mismatch between the PUF cells in these differential PUF bits is insufficient to overcome the margin 0 settings to result in a reliable read of a 1, and instead are read as 0.

Referring back to method 600 of FIG. 6, after the margin 0 read, the PUF word is read with the margin 1 setting to obtain a second read output (block 612). Note that any of the read outputs during enrollment may be saved within storage circuitry within enrollment circuitry 24. In performing the read with the margin 1 settings, the drive strengths of the SL and SLb of each differential bit column in array 202 are skewed so that that the margin 1 read will force all differential bits that are located in the unstable region to be read as a logic 1. Therefore, in one embodiment, MSb0 and MSb1 are asserted to a logic level one (thus MS1 and MS1 are deasserted or negated to a logic level zero). This results in turning on Mmb00, Mmb10, Mmb01, and Mmb11 while turning off Mm00, Mm10, Mm01, and MM11. This increases the drive strength on each of SLb0 and SLb1 with respect to SL0 and SL1, respectively, such that the drive strengths are skewed in the opposite direction as compared to the margin 0 setting.

Figures 4C, 4D:
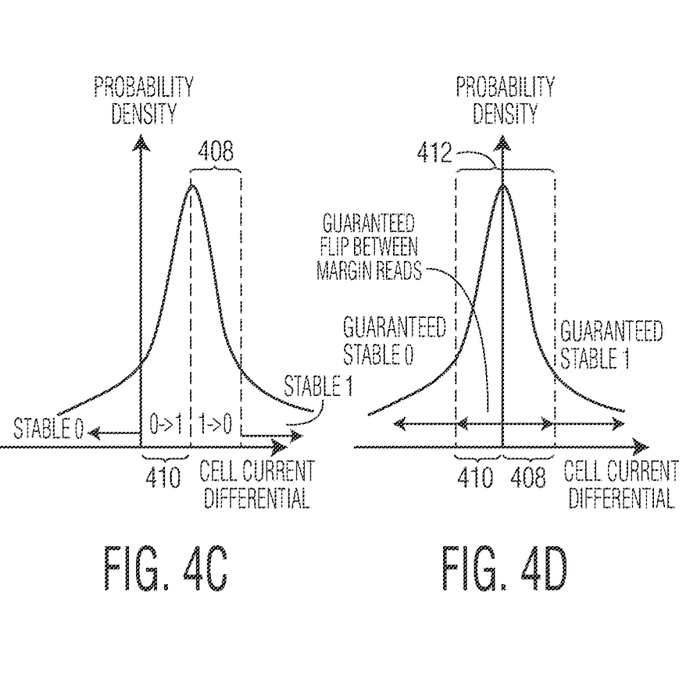

By skewing the drive strength in this manner the probability density is shifted to the right, as seen in FIG. 4C, in which those bits that were in the portion of the unstable region storing zeros (such as in FIG. 4A) are forced to flip and be read as a 1, as indicated by region 410 in FIG. 4C. That is, within region 410, the mismatch between the PUF cells in these differential PUF bits is insufficient to overcome the margin 1 settings to result in a reliable read of a 0, and instead are read as 1. Therefore, as shown in FIG. 4D, region 412 is identified in the probability distribution of bits in which the differential PUF bits in region 412 are guaranteed to flip states between margin reads (between a margin 0 read and a margin 1 read).

Referring to method 600, for each PUF word, after the margin 0 read and the margin 1 read, the first and second read outputs from blocks 610 and 612 are bit compared (in block 614) to actually identify which are the stable bits (and thus which bits are the unstable bits) in array 202. In one embodiment, each bit of the first read output is compared (e.g. XORed) with the corresponding bit of the second read output (in which the corresponding bits of the first and second read output correspond to the same differential bit location in array 202 but read using different margin settings). For each bit of the PUF word in which the bit in the first read output differs from the corresponding bit in the second read output (e.g. when the output of the XOR operation is a "1", the differential PUF bit in array 202 is identified as unstable, since the differential PUF bit value changed with the different margin settings. On the other hand when the bits match (e.g. when the output of the XOR operation is a "0"), the differential PUF bit in array 202 is identified as stable, since the differential PUF bit value did not change with the different margin settings. In this manner, the size of region 412 of the probability distribution curve of FIG. 4D can be changed based on the desired yield.

Note that the margin reads are directed by enrollment circuitry 24 in that they can be performed by enrollment circuitry 24 communicating directly with PUF 18, or alternatively, can be performed via PUF evaluation engine 16 in which PUF evaluation engine 16 provides the addresses received from enrollment circuitry 24 and provides the outputs from PUF 18 back to enrollment circuitry 24.

After the margin 0 and margin 1 reads have been performed for each PUF word in array 202, the yield of stable bits (e.g. count of stable bits) can be determined. This may be performed by, for example, using a counter within enrollment circuitry 24. If, at decision diamond 616, the desired yield is not achieved (i.e. an insufficient number of stable bits have been identified or the number of identified stable bits is less than a threshold number of stable bits), a next margin setting (e.g. a weaker margin setting) at the given V, T can be used to skew the drive strengths for a next margin 0 read and margin 1 read (block 618 and back to block 608). For example, for a weaker margin 0 setting, only MS0 may be asserted and not MS1 so that only one additional source bias transistor (Mm00) is turned on, thus providing a weaker drive strength on SL0 as compared to turning on both Mm00 and Mm10. Similarly, for a weaker margin 1 setting, only MSb0 may be asserted and not MSb1 so that only Mmb00 is turned on, thus providing a weaker drive strength on SLb0 as compared to turning on both Mmb00 and Mmb10. By using weaker margin settings, it may be easier for a differential PUF bit to overcome the skew conditions, resulting in a greater yield of stable bits. In this manner, the skew in drive strength settings between the SL and SLb can be changed to either increase or strengthen the skew (which will yield fewer stable bits) or decrease or weaken the skew (which will yield more stable bits). Note that bits which are identified as "stable" with weaker margin reads may be identified as unstable when stronger margin reads are used. That is, bits can have varying degrees of "stability" depending upon the margin conditions used during enrollment. In this manner, enrollment can be performed with a selected margin and desired yield which balances various factors such as yield vs stability (e.g. long term reliability).

In one embodiment, the size of unstable region 412 and the strength of the margin 0 and margin 1 skews are a function of a given application for PUF 18. For example, in an automotive application with a wide temperature region, unstable region 412 will be larger and contain more unstable PUF bits than an application with a commercial (and thus smaller) temperature range. Therefore, a technology evaluation may be performed to determine the margin settings and the desired yield.

As discussed above, the specific margin transistors selected for the margin 0 and margin 1 settings may include more margin transistors than just 1 or 2 (if more margin transistors are included in parallel with the corresponding always-on source bias transistor), or each margin transistor may differ in size in which the enabling of each margin transistor provides a weighted change in drive strength.

Also, the skew provided with the margin settings for the margin 0 read may be different in magnitude than the skew provided with the margin settings for the margin 1 read. Also, the margin 1 read may be performed prior to the margin 0 read.

Referring back to FIG. 6, if the desired yield of stable bits has been achieved at decision diamond 616, method 600 proceeds to block 620 to complete the enrollment process by determining subwords of stable bits and store helper data to identify the stable sub words in NVM 22. In this manner, addressable portions (e.g. subwords) of array 202 can be identified by the helper data in NVM 22 for use in PUF generation by PUF evaluation engine 16.

Figure 5:
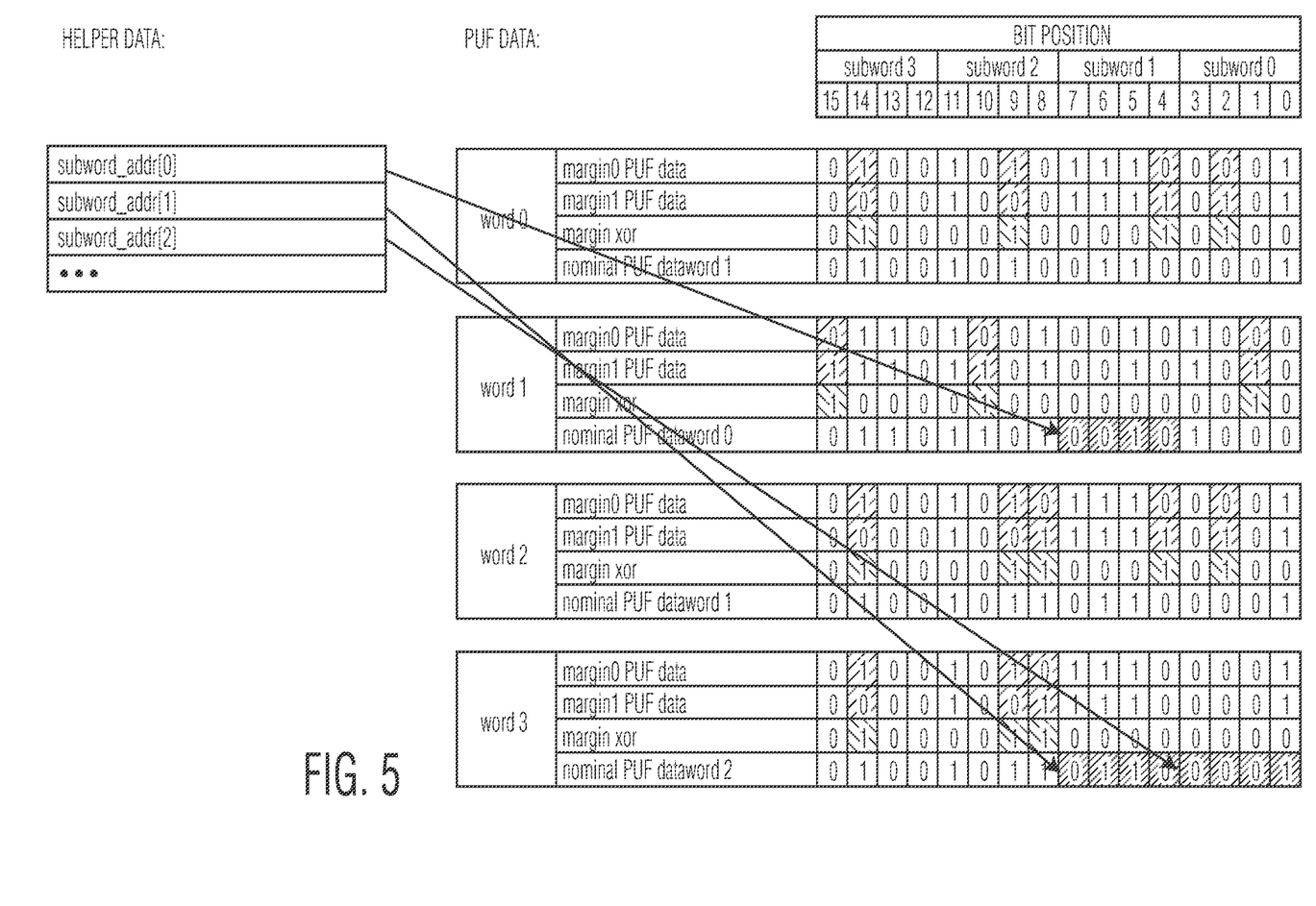
FIG. 5 illustrates, in diagrammatic form, operation of the enrollment circuit of FIG. 1 in accordance with an embodiment.

FIG. 5 illustrates the margin reads performed on word0-word3 of array 202. in FIG. 5, the bit positions for each subword are provided in the upper right hand corner, in which each subword is a grouping of 4 bits within a 16-bit word, such that each word includes 4 subwords, subword0-subword3. Note that the "subword" may be any portion of an addressable unit of array 202 (in which the addressable unit may be larger or smaller than a word), and may include any number of bits of the addressable unit.

For word0 in array 202, it is assumed that for the margin 0 read, the first read output (referred to as margin0 PUF data and stored in enrollment circuitry 24) provides %0100101011100001 for the 16 bits of word0 and for the margin 1 read, the second read output (referred to as margin1 PUF data and stored in enrollment circuitry 24) provides %0000100011110101. The resulting bit comparison (identified as the "margin XOR" in FIG. 5), therefore provides %0100101001100001. The portions with the wider hash marks correspond to bit positions which do not match and are therefore identified as unstable bits. (The forward slanting wider hash marks correspond to bits of the margin 0 and 1 read outputs, and the backward slanting wider hash marks correspond to the non-matching results.) The identified unstable bits include bits 14, 9, 4, and 2. There are no subwords in word0 which include all stable bits (e.g. 4 stable bits). Therefore, the helper data stored in NVM 22 does not identify any subword from word0 as a stable subword for use in PUF generation.

For word1 in array 202, though, although bits 15, 10, and 1 are identified as unstable bit positions, all bit positions within subword1 of word 1 are identified as stable. Therefore, the address for subword1 (having the narrower hash marks) of word1 is stored as the first subword address (subword_addr[0]) as helper data in NVM 22. For word2, like word0 no subwords of stable data are identified. However, for word3, subword1 and subword0 (corresponding to bit positions 7-4 and 3-0 and also having the narrower hash marks) are identified as stable. Therefore the addresses for these subwords of word3 are stored as the second and third subword addresses (subword_addr[1] and subword_addr[2]) as helper data in NVM 22.

The enrollment can be performed off-chip, in which case enrollment circuitry 24 is located off-chip with respect to PUF 18, PUF evaluation engine 16, security module 14, and processor core 12, such as in an external tester. Helper data NVM 22 is may be located on the same IC as PUF evaluation engine 16, and may be implemented using electrically programmable fuses. Alternatively, NVM 22 may be located off-chip with enrollment circuitry 24 and used during enrollment, but after final test the helper data from NVM 22 may be stored within storage circuitry elsewhere in data processing system 10, or within PUF evaluation engine 16. In another embodiment, enrollment circuitry 24 is located on-chip with PUF 18 and PUF evaluation engine 16, in which enrollment can be performed anytime, and not just during final test in manufacturing.

In FIG. 6, after enrollment is done, the helper data in NVM 22 is used for reconstruction during normal operation (block 622). That is, after final testing and once data processing system 10 is being used in the field after manufacturing and assembly (i.e. in production), the helper data is used by PUF evaluation engine 16 to ensure that only the subwords identified by the helper data are used to produce the PUF outputs and thus the digital code. Also, during normal operation, all of the margin transistors, which were selectively enabled during enrollment, are turned off (disabled) such that only the always-on source bias transistors (e.g. M0, M1) are used as source bias transistors during normal operation for reads of PUF 18.

Note that in the illustrated embodiment of FIG. 2, the PUF cells within a differential PUF bit are matched such that the differential PUF bit is symmetrical, and the PUF cells are coupled to corresponding lines of a complementary bit line pair. However, in alternate embodiments, the differential PUF bits need not be symmetrical. Also, in an alternate embodiment, two independent bit lines and two independent source lines can be used instead of the BL/BLb pair and the SL/SLb pair, respectively. The bit lines and source lines would have to be controlled appropriately, though, to allow proper access to the selected differential PUF bits coupled to the bit lines and source lines. Also, in one embodiment, all the source lines are tied together and all the complementary source lines are tied together. In this manner, the always-on source bias transistors and any enabled margin transistors all operate in parallel, which may allow for smaller source bias transistors to be used in PUF 18.

Therefore, by now it can be appreciated how the sizing of precharge transistors or source bias transistors, or both, to have weaker drive strengths (close to the drive strength of the PUF cells) in a PUF array can be used to increase the current differential caused by mismatch between PUF cells within a differential PUF bit. This may increase the capability of a sense amplifier of the PUF array to reliably sense PUF bits that would otherwise be marginal (too closely matched). This sizing may also limit the bit line voltage swing (on the bit lines and complementary bit lines), which may result in reducing dynamic power consumption during operation of the PUF array. Furthermore, margin transistors connected in parallel with always-on source bias transistors can be selectively enabled during an enrollment process to identify stable bits within a PUF array for use in providing a PUF response using the PUF array.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

In one embodiment, a physically unclonable function (PUF) includes an array of differential PUF bits arranged in rows and columns, wherein: each row includes a corresponding word line and each column includes a corresponding first bit line, a corresponding second bit line, a corresponding first source line, and a corresponding second source line, and each differential PUF bit, located at an intersection of a row and a column, includes a first PUF cell coupled to the corresponding first bit line and the corresponding first source line and a second PUF cell coupled to the corresponding second bit line and the corresponding second source line, wherein each of the first and second PUF cells is coupled to the corresponding word line; a source bias transistor coupled between each corresponding first source line and a first power supply terminal and between each corresponding second source line and the first power supply terminal, wherein a gate electrode of each of the source bias transistors is coupled to a second power supply terminal, in which the first power supply terminal is coupled to receive a lower voltage than the second power supply terminal; and a corresponding set of margin transistors coupled in parallel with each source bias transistor, wherein a gate electrode of each margin transistor is coupled to receive a corresponding margin setting control signal. In one aspect, the PUF further includes a precharge transistor coupled between each corresponding first bit line and the second power supply terminal and between each corresponding second bit line and the second power supply terminal, wherein a gate electrode of each of the precharge transistors is coupled to receive a precharge signal. In a further aspect, the ratio of transistor width to transistor length of each precharge transistor is no more than twice the ratio of transistor width to transistor length of any transistor within a PUF cell of the array. In another aspect of the above embodiment, the ratio of transistor width to transistor length of each source bias transistor is no more than twice the ratio of transistor width to transistor length of any transistor within a PUF cell of the array. In another aspect, each PUF cell of the array includes a single N-channel transistor, and each margin transistor is sized equally. In another aspect, each corresponding second bit line is complementary to the corresponding first bit line, and each corresponding second source line is complementary to the corresponding second source line. In yet another aspect, each column has a corresponding sense amplifier coupled to the corresponding first bit line and the corresponding second bit line and having an output configured to provide a corresponding data bit stored in a selected differential PUF bit of the array. In another aspect, for each column of the array: a first set of margin transistors coupled to the corresponding first source line is configured to receive a first margin setting control signal, and a second set of margin transistors coupled to the corresponding second source line is configured to receive a second margin setting control signal. In a further aspect, wherein during normal operation, the first and second margin setting control signals are set so as to disable each margin transistor in each first set of margin transistors and each margin transistor in each second set of margin transistors. In a further aspect, during enrollment in which unstable differential PUF bits of the array are identified, and prior to normal operation, the second margin setting control signal is complementary to the first margin setting control signal. In yet a further aspect, wherein during the enrollment, the PUF is configured to, for a first read operation, receive a first value for each first margin control signal to enable each of the first set of margin transistors and a first value for each second margin control signal to disable each of the second set of margin transistors, and, for a second read operation, receive a second value for each first margin control signal to disable each of the first set of margin transistors and a second value for each second margin control signal to enable each of the second set of margin transistors.

In another embodiment, a system includes a physically unclonable function (PUF) having an array of differential PUF bits arranged in rows and columns, a plurality of source bias transistors, and a plurality of margin setting transistors, wherein: each row includes a corresponding word line and each column includes a corresponding first bit line, a corresponding second bit line, a corresponding first source line, and a corresponding second source line, each differential PUF bit, located at an intersection of a row and a column, includes a first PUF cell coupled to the corresponding first bit line and the corresponding first source line and a second PUF cell coupled to the corresponding second bit line and the corresponding second source line, wherein each of the first and second PUF cells is coupled to the corresponding word line, a source bias transistor of the plurality of source bias transistors is coupled between each corresponding first source line and a first power supply terminal and between each corresponding second source line and the first power supply terminal, wherein a gate electrode of each of the plurality of source bias transistors is coupled to a second power supply terminal, in which the first power supply terminal is coupled to receive a lower voltage than the second power supply terminal, and each margin setting transistor of the plurality of margin setting transistors is coupled in parallel with a corresponding source bias transistor. The system also includes enrollment circuitry configured to determine a first set of stable differential PUF bits by: directing a first margin read of the array while enabling first subsets of the plurality of margin setting transistors coupled to the corresponding first source lines of the array and disabling margin setting transistors of the plurality of margin setting transistors coupled to the corresponding second source lines of the array such that, for each column, a first drive strength on the corresponding first source line is skewed in a first direction from a first drive strength on the corresponding second source line, and storing a first read output of the first margin read. In one aspect of the another embodiment, the enrollment circuitry is configured to determine the first set of stable differential PUF bits by further: directing a second margin read of the array while disabling margin setting transistors of the plurality of margin transistors coupled to the corresponding first source lines of the array and enabling second subsets of the plurality of margin setting transistors coupled to the corresponding second source lines of the array such that, for each column, a second drive strength on the corresponding first source line is skewed in a second direction, opposite the first direction, from a second drive strength on the corresponding second source line, and storing a second read output for the second margin read. In a further aspect, each of the first subsets of the plurality of margin setting transistors includes one or more transistors, and each of the second subsets of the plurality of margin setting transistors includes one or more transistors. In yet a further aspect, in each of the first subsets of the plurality of margin setting transistors, the one or more transistors are equally sized, and in each of the second subsets of the plurality of margin setting transistors, the one or more transistors are equally sized. In another aspect of the another embodiment, the enrollment circuitry is configured to determine the first set of stable differential PUF bits by further: performing a bit compare between the first read output and the second read output and identifying differential PUF bits corresponding to matching bit compares as included in the first set of stable differential PUF bits. In a further aspect, the enrollment circuitry is configured to, in response to determining that the first set of stable differential PUF includes less than a threshold number of stable differential PUF bits, determine a second set of stable differential PUF bits by: directing a third margin read of the array while enabling third subsets of the plurality of margin setting transistors coupled to the corresponding first source lines of the array and disabling margin setting transistors of the plurality of margin setting transistors coupled to the corresponding second source lines of the array such that, for each column, a third drive strength on the corresponding first source line is skewed in the first direction from a third drive strength on the corresponding second source line, the third drive strength on the corresponding first source line being stronger or weaker than the first drive strength on the corresponding first source line, and storing a third read output of the third margin read. In a further aspect, the enrollment circuitry is configured to determine the second set of stable differential PUF bits by further: directing a fourth margin read of the array while disabling margin setting transistors of the plurality of margin setting transistors coupled to the corresponding first source lines of the array and enabling fourth subsets of the plurality of margin transistors coupled to the corresponding second source lines of the array such that, for each column, a fourth drive strength on the corresponding first source line is skewed in the second direction from a fourth drive strength on the corresponding second source line, the fourth drive strength on the corresponding second source line being stronger or weaker from the second drive strength on the corresponding second source line, and storing a fourth read output for the fourth margin read. In a further aspect, the enrollment circuitry is configured to determine the second set of stable differential PUF bits by further: performing a bit compare between the third read output and the fourth read output and identifying differential PUF bits corresponding to matching bit compares as included in the second set of stable differential PUF bits.

In yet another embodiment, a system includes a physically unclonable function (PUF) array of differential PUF bits arranged in rows and columns, wherein a first row includes a first word line and a first column includes a first bit line, a second bit line, a first source line, and a second source line, wherein an intersection of the first row and the first column corresponds to a differential PUF bit; a first source bias transistor having a gate electrode coupled to a first power supply terminal, a drain coupled to the first source line, and a source coupled to a second power supply terminal, wherein the first power supply terminal is coupled to provide a greater voltage than the second power supply terminal; a first set of margin setting transistors coupled in parallel with the first source bias transistor; a second source bias transistor having a gate electrode coupled to the first power supply terminal, a drain coupled to the second source line, and a source coupled to the second power supply terminal; a second set of margin setting transistors coupled in parallel with the second source bias transistor; a sense amplifier coupled to the first and second bit lines and configured to output a data value stored in the differential PUF bit in response to a read of the differential PUF bit. The system also includes enrollment circuitry configured to: perform a first read of the differential PUF bit while enabling at least one margin setting transistor of the first set of margin transistors and disabling the second set of margin setting transistors to obtain a first read output, perform a second read of the differential PUF bit while enabling at least one margin setting transistor of the second set of margin transistors and disabling the first set of margin setting transistors to obtain a second read output; and comparing the first and second read outputs to determine whether the differential PUF bit is unstable.

What is claimed is:

1. A physically unclonable function (PUF) comprising:
an array of differential PUF bits arranged in rows and columns, wherein:
   each row comprises a corresponding word line and each column comprises a corresponding first bit line, a corresponding second bit line, a corresponding first source line, and a corresponding second source line, and
   each differential PUF bit, located at an intersection of a row and a column, includes a first PUF cell coupled to the corresponding first bit line and the corresponding first source line and a second PUF cell coupled to the corresponding second bit line and the corresponding second source line, wherein each of the first and second PUF cells is coupled to the corresponding word line;
a source bias transistor coupled between each corresponding first source line and a first power supply terminal and between each corresponding second source line and the first power supply terminal, wherein a gate electrode of each of the source bias transistors is coupled to a second power supply terminal, in which the first power supply terminal is coupled to receive a lower voltage than the second power supply terminal; and
a corresponding set of margin transistors coupled in parallel with each source bias transistor, wherein a gate electrode of each margin transistor is coupled to receive a corresponding margin setting control signal.

2. The PUF of claim 1, further comprising:
a precharge transistor coupled between each corresponding first bit line and the second power supply terminal and between each corresponding second bit line and the second power supply terminal, wherein a gate electrode of each of the precharge transistors is coupled to receive a precharge signal.

3. The PUF of claim 2, wherein the ratio of transistor width to transistor length of each precharge transistor is no more than twice the ratio of transistor width to transistor length of any transistor within a PUF cell of the array.

4. The PUF of claim 1, wherein the ratio of transistor width to transistor length of each source bias transistor is no more than twice the ratio of transistor width to transistor length of any transistor within a PUF cell of the array.

5. The PUF of claim 1, wherein each PUF cell of the array includes a single N-channel transistor, and each margin transistor is sized equally.

6. The PUF of claim 1, wherein each corresponding second bit line is complementary to the corresponding first bit line, and each corresponding second source line is complementary to the corresponding second source line.

7. The PUF of claim 1, wherein each column has a corresponding sense amplifier coupled to the corresponding first bit line and the corresponding second bit line and having an output configured to provide a corresponding data bit stored in a selected differential PUF bit of the array.

8. The PUF of claim 1, wherein for each column of the array:
a first set of margin transistors coupled to the corresponding first source line is configured to receive a first margin setting control signal, and
a second set of margin transistors coupled to the corresponding second source line is configured to receive a second margin setting control signal.

9. The PUF of claim 8, wherein during normal operation, the first and second margin setting control signals are set so as to disable each margin transistor in each first set of margin transistors and each margin transistor in each second set of margin transistors.

10. The PUF of claim 9, wherein during enrollment in which unstable differential PUF bits of the array are identified, and prior to normal operation, the second margin setting control signal is complementary to the first margin setting control signal.

11. The PUF of claim 10, wherein during the enrollment, the PUF is configured to, for a first read operation, receive a first value for each first margin control signal to enable each of the first set of margin transistors and a first value for each second margin control signal to disable each of the second set of margin transistors, and, for a second read operation, receive a second value for each first margin control signal to disable each of the first set of margin transistors and a second value for each second margin control signal to enable each of the second set of margin transistors.

12. A system comprising:
a physically unclonable function (PUF) having an array of differential PUF bits arranged in rows and columns, a plurality of source bias transistors, and a plurality of margin setting transistors, wherein:
   each row comprises a corresponding word line and each column comprises a corresponding first bit line, a corresponding second bit line, a corresponding first source line, and a corresponding second source line,
   each differential PUF bit, located at an intersection of a row and a column, includes a first PUF cell coupled to the corresponding first bit line and the corresponding first source line and a second PUF cell coupled to the corresponding second bit line and the corresponding second source line, wherein each of the first and second PUF cells is coupled to the corresponding word line, a source bias transistor of the plurality of source bias transistors is coupled between each corresponding first source line and a first power supply terminal and between each corresponding second source line and the first power supply terminal, wherein a gate electrode of each of the plurality of source bias transistors is coupled to a second power supply terminal, in which the first power supply terminal is coupled to receive a lower voltage than the second power supply terminal, and each margin setting transistor of the plurality of margin setting transistors is coupled in parallel with a corresponding source bias transistor; and enrollment circuitry configured to determine a first set of stable differential PUF bits by:

directing a first margin read of the array while enabling first subsets of the plurality of margin setting transistors coupled to the corresponding first source lines of the array and disabling margin setting transistors of the plurality of margin setting transistors coupled to the corresponding second source lines of the array such that, for each column, a first drive strength on the corresponding first source line is skewed in a first direction from a first drive strength on the corresponding second source line, and storing a first read output of the first margin read.

13. The system of claim 12, wherein the enrollment circuitry is configured to determine the first set of stable differential PUF bits by further:

directing a second margin read of the array while disabling margin setting transistors of the plurality of margin transistors coupled to the corresponding first source lines of the array and enabling second subsets of the plurality of margin setting transistors coupled to the corresponding second source lines of the array such that, for each column, a second drive strength on the corresponding first source line is skewed in a second direction, opposite the first direction, from a second drive strength on the corresponding second source line, and storing a second read output for the second margin read.

14. The system of claim 13, wherein each of the first subsets of the plurality of margin setting transistors includes one or more transistors, and each of the second subsets of the plurality of margin setting transistors includes one or more transistors.

15. The system of claim 14, wherein, in each of the first subsets of the plurality of margin setting transistors, the one or more transistors are equally sized, and in each of the second subsets of the plurality of margin setting transistors, the one or more transistors are equally sized.

16. The system of claim 13, wherein the enrollment circuitry is configured to determine the first set of stable differential PUF bits by further:

performing a bit compare between the first read output and the second read output and identifying differential PUF bits corresponding to matching bit compares as included in the first set of stable differential PUF bits.

17. The system of claim 16, wherein the enrollment circuitry is configured to, in response to determining that the first set of stable differential PUF includes less than a threshold number of stable differential PUF bits, determine a second set of stable differential PUF bits by:

directing a third margin read of the array while enabling third subsets of the plurality of margin setting transistors coupled to the corresponding first source lines of the array and disabling margin setting transistors of the plurality of margin setting transistors coupled to the corresponding second source lines of the array such that, for each column, a third drive strength on the corresponding first source line is skewed in the first direction from a third drive strength on the corresponding second source line, the third drive strength on the corresponding first source line being stronger or weaker than the first drive strength on the corresponding first source line, and storing a third read output of the third margin read.

18. The system of claim 17, wherein the enrollment circuitry is configured to determine the second set of stable differential PUF bits by further:

directing a fourth margin read of the array while disabling margin setting transistors of the plurality of margin setting transistors coupled to the corresponding first source lines of the array and enabling fourth subsets of the plurality of margin transistors coupled to the corresponding second source lines of the array such that, for each column, a fourth drive strength on the corresponding first source line is skewed in the second direction from a fourth drive strength on the corresponding second source line, the fourth drive strength on the corresponding second source line being stronger or weaker from the second drive strength on the corresponding second source line, and storing a fourth read output for the fourth margin read.

19. The system of claim 18, wherein the enrollment circuitry is configured to determine the second set of stable differential PUF bits by further:

performing a bit compare between the third read output and the fourth read output and identifying differential PUF bits corresponding to matching bit compares as included in the second set of stable differential PUF bits.

20. A system comprising:

a physically unclonable function (PUF) array of differential PUF bits arranged in rows and columns, wherein a first row comprises a first word line and a first column comprises a first bit line, a second bit line, a first source line, and a second source line, wherein an intersection of the first row and the first column corresponds to a differential PUF bit;

a first source bias transistor having a gate electrode coupled to a first power supply terminal, a drain coupled to the first source line, and a source coupled to a second power supply terminal, wherein the first power supply terminal is coupled to provide a greater voltage than the second power supply terminal;

a first set of margin setting transistors coupled in parallel with the first source bias transistor;

a second source bias transistor having a gate electrode coupled to the first power supply terminal, a drain coupled to the second source line, and a source coupled to the second power supply terminal;

a second set of margin setting transistors coupled in parallel with the second source bias transistor;

a sense amplifier coupled to the first and second bit lines and configured to output a data value stored in the differential PUF bit in response to a read of the differential PUF bit; and enrollment circuitry configured to:

perform a first read of the differential PUF bit while enabling at least one margin setting transistor of the first set of margin transistors and disabling the second set of margin setting transistors to obtain a first read output, perform a second read of the differential PUF bit while enabling at least one margin setting transistor of the second set of margin transistors and disabling the first set of margin setting transistors to obtain a second read output;
comparing the first and second read outputs to determine whether the differential PUF bit is unstable.

* * * * *